(12) United States Patent
Zawaideh et al.

(10) Patent No.: US 8,744,502 B2
(45) Date of Patent: Jun. 3, 2014

(54) ANTENNA TO TRANSCEIVER MAPPING OF A MULTIMODE WIRELESS DEVICE

(75) Inventors: Fahed I. Zawaideh, San Diego, CA (US); Chintan S. Shah, San Diego, CA (US); Raghuveer Mallikarjunan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 335 days.

(21) Appl. No.: 13/209,288

(22) Filed: Aug. 12, 2011

(65) Prior Publication Data

US 2013/0040671 A1 Feb. 14, 2013

(51) Int. Cl.
*H04B 7/00* (2006.01)

(52) U.S. Cl.
USPC ....... 455/500; 455/67.11; 455/13.3; 455/101; 455/103

(58) Field of Classification Search
CPC ......... H01Q 3/00; H04W 60/00; H04W 48/18
See application file for complete search history.

(56) References Cited

U.S. PATENT DOCUMENTS

| | | | |
|---|---|---|---|
| 2008/0051165 A1 | 2/2008 | Burgan et al. | |
| 2008/0085736 A1 | 4/2008 | Kitamura et al. | |
| 2008/0132283 A1 | 6/2008 | Ponce De Leon et al. | |
| 2008/0267108 A1 | 10/2008 | Zhang et al. | |
| 2009/0017767 A1 | 1/2009 | Mashimo | |
| 2009/0232100 A1 | 9/2009 | Faber | |
| 2009/0267828 A1* | 10/2009 | Kobayashi et al. | 342/357.06 |
| 2009/0276828 A1 | 11/2009 | Swander et al. | |
| 2009/0325528 A1 | 12/2009 | Yokota et al. | |
| 2010/0120466 A1 | 5/2010 | Li | |
| 2010/0285759 A1 | 11/2010 | Chung et al. | |
| 2010/0304685 A1* | 12/2010 | Wietfeldt et al. | 455/67.11 |
| 2012/0044115 A1* | 2/2012 | McCaughey et al. | 343/702 |

OTHER PUBLICATIONS

International Search Report and Written Opinion—PCT/US2012/049052—ISA/EPO—Apr. 1, 2013.
Partial International Search Report—PCT/US2012/049052—ISA/EPO—Nov. 6, 2012.

\* cited by examiner

*Primary Examiner* — Fayyaz Alam
*Assistant Examiner* — Mohammed Rachedine
(74) *Attorney, Agent, or Firm* — Kilpatrick Townsend & Stockton LLP

(57) ABSTRACT

Various arrangements for mapping antennas to transceivers are presented. A plurality of antennas may be present. Each antenna of the plurality of antennas may be configured to communicate using different radio technologies. A plurality of transceivers may be present. At least some of the transceivers of the plurality of transceivers may be configured to utilize different radio technologies. A selector circuit may be present that is configured, based on input from a processor, to map each antenna of the plurality of antennas with each transceiver of the plurality of transceivers. The processor may be configured to control which antennas of the plurality of antennas are mapped to which transceiver of the plurality of transceivers. Touch sensors may be used to determine which antenna or antennas are likely to serve as effective electromagnetic transducers. Signal-to-noise measurements may be used to determine when to modify an antenna mapping.

33 Claims, 8 Drawing Sheets

ANTENNA TO TRANSCEIVER MAPPING OF A MULTIMODE WIRELESS DEVICE

BACKGROUND

Devices capable of wireless communication may have multiple antennas. For example, a consumer cellular phone may have one or more antennas associated with cellular communication and local wireless protocols. Each of these antennas may be coupled with a transceiver that transmits and/or receives using a particular radio technology. Depending on environmental conditions or how a user is holding the device, for example, certain antennas may be less effective at communication than other antennas. Arrangements for determining which antennas are likely to be most effective at receiving and/or transmitting wireless signals are desired and may be useful to conserve power of wireless devices.

SUMMARY

Systems, methods, and devices, are described for mapping antennas to transceivers. In some embodiments, a device capable of mapping antennas to transceivers is presented. The device may include a plurality of antennas, wherein each antenna of the plurality of antennas is configured to receive radio signals in accordance with a plurality of radio technologies. The device may include a plurality of transceivers. The first transceiver of the plurality of transceivers may be configured to utilize a first radio technology of the plurality of radio technologies. The second transceiver of the plurality of transceivers may be configured to utilize a second radio technology of the plurality of radio technologies. The device may include a processor configured to determine a mapping between one or more antennas of the plurality of antennas and at least one of the first transceiver and the second transceiver.

Embodiments of such a device may include one or more of the following: A selector circuit that is configured, based on input from the processor, to map the one or more antennas of the plurality of antennas with one or more transceivers of the plurality of transceivers. The processor may be further configured to map the one or more antennas with one or more transceivers of the plurality of transceivers using soft switching. The processor may be further configured to determine to unmap the first transceiver of the plurality of transceivers from all antennas of the plurality of antennas when the first transceiver is not in use. The processor may be further configured to determine to map two antennas of the plurality of antennas with the second transceiver of the plurality of transceivers. A plurality of touch sensors may be present, wherein each touch sensor of the plurality of touch sensors indicates contact for a corresponding antenna of the plurality of antennas. The processor may be further configured to receive touch indications from each touch sensor of the plurality of touch sensors. Each touch indication may indicate whether the corresponding antenna of the plurality of antennas is in contact with a physical entity. The processor may be configured to analyze the touch indications received from the plurality of touch sensors to identify the one or more antennas of the plurality of antennas that is in a least amount of contact with a physical entity. The processor may be configured to assign an antenna of the plurality of antennas to the second transceiver of the plurality of transceivers at least partially based on analyzing the touch indications from the plurality of touch sensors. Each of the first transceiver and the second transceiver may implement only one of a receive function and a transmit function. The device may include a plurality of signal to noise measurement collectors, wherein each signal to noise measurement collector corresponds to a transceiver of the plurality of transceivers, and each signal to noise measurement collector of the plurality of signal to noise measurement collectors may be configured to transmit signal-to-noise measurements associated with the corresponding transceiver to the processor. The processor may be further configured to: receive the signal-to-noise measurements from each signal to noise measurement collector of the plurality of signal to noise measurement collectors; and use at least one of the received signal-to-noise measurements to determine when an antenna mapping is to be modified. The device may include a plurality of touch sensors wherein each touch sensor of the plurality of touch sensors indicates contact for a corresponding antenna of the plurality of antennas. The processor may be further configured to: receive touch indications from each touch sensor of the plurality of touch sensors, wherein each touch indication indicates whether the corresponding antenna of the plurality of antennas is in contact with a physical entity; and determine a modification to the antenna mapping, based at least in part on the received touch indications, when it is determined that the antenna mapping is to be modified.

In some embodiments, a method for mapping antennas to transceivers is presented. The method may include identifying one or more antennas of a plurality of antennas likely to serve as an effective electromagnetic transducer for a first radio technology of a plurality of radio technologies. Each antenna of the plurality of antennas may be configured to receive radio signals in accordance with the plurality of radio technologies. The method may include mapping the one or more antennas to a first transceiver of a plurality of transceivers. The first transceiver of the plurality of transceivers may be configured to utilize the first radio technology of the plurality of radio technologies.

Embodiments of such a method may include one or more of the following: The method may include identifying a plurality of idle antennas of the plurality of antennas, wherein each idle antenna is currently not being used for communication and the one or more antennas are part of the plurality of idle antennas. The plurality of antennas and the plurality of transceivers may be part of a mobile device, the plurality of antennas may comprise all antennas of the mobile device, and the plurality of transceivers may comprise all transceivers of the mobile device. Identifying may comprise identifying two antennas of the plurality of antennas, and wherein the mapping comprises mapping the two antennas to the first transceiver. The method may include receiving touch indications from a plurality of touch sensors, wherein each touch indication indicates whether a corresponding antenna of the plurality of antennas is in contact with a physical entity, and wherein the identifying is based at least in part on the received touch indications. Identifying the one or more antennas likely to serve as the effective electromagnetic transducer comprises analyzing touch indications received from the plurality of touch sensors to identify the one or more antennas that is in a least amount of contact with a physical entity. The method may include receiving signal-to-noise measurements from each signal to noise measurement collector of a plurality of signal to noise measurement collectors; and prior to analyzing the touch indications, using at least one signal-to-noise measurement to determine that an antenna mapping is to be modified. The method may include determining a signal-to-noise measurement associated with the first transceiver of the plurality of transceivers, and prior to the identifying, determining to modify a mapping of antennas to the first transceiver of the plurality of transceivers based at least in part on the signal-to-noise measurement.

In some embodiments, a computer readable medium is presented. The computer readable medium comprises instructions configured to cause a computer to: Identify one or more antennas of a plurality of antennas likely to serve as an effective electromagnetic transducer for a first radio technology of a plurality of radio technologies. Each antenna of the plurality of antennas is configured to receive radio signals in accordance with the plurality of radio technologies. The instructions may comprise instructions configured to cause the computer to map the one or more antennas to a first transceiver of a plurality of transceivers. The first transceiver of the plurality of transceivers may be configured to utilize the first radio technology of the plurality of radio technologies.

Embodiments of such a computer readable medium may include one or more of the following: The instructions may be further configured to cause the computer to transmit an indication to a selector circuit that indicates to map the one or more antennas with the first transceiver of the plurality of transceivers. The instructions configured to cause the computer to identify the one or more antennas may comprise instructions to cause the computer to identify two antennas of the plurality of antennas, and the instructions configured to cause the computer to map may comprise instruction to cause the computer to map the two antennas to the first transceiver. The instructions may be further configured to cause the computer to: receive touch indications from a plurality of touch sensors, wherein each touch indication indicates whether a corresponding antenna of the plurality of antennas is in contact with a physical entity. The instructions configured to cause the computer to identify the one or more antennas likely to serve as the effective electromagnetic transducer further comprise instructions configured to cause the computer to analyze the touch indications received from the plurality of touch sensors to identify one or more antennas that is in a least amount of contact with the physical entity. The instructions may be configured to cause the computer to: cause the first transceiver of the plurality of transceivers to be unmapped from all antennas of the plurality of antennas when the first transceiver is not in use. The instructions may be configured to cause the computer to: receive signal-to-noise measurements, wherein each signal-to-noise measurement is associated with a corresponding transceiver of the plurality of transceivers; wherein the instructions configured to cause the computer to determine to modify the mapping to the antenna of the plurality of antennas further comprise instructions to cause the computer to use at least one of the signal-to-noise measurements.

In some embodiments, an apparatus for mapping antennas to transceivers is presented. The apparatus may include means for identifying one or more antennas of a plurality of antennas likely to serve as an effective electromagnetic transducer for a first radio technology of a plurality of radio technologies. Each antenna of the plurality of antennas may be configured to receive radio signals in accordance with the plurality of radio technologies. The apparatus may include means for mapping the one or more antennas to a first transceiver of a plurality of transceivers.

Embodiments of such an apparatus may include one or more of the following: means for identifying a plurality of idle antennas of the plurality of antennas, wherein each idle antenna is currently not being used for communication and the one or more antennas are part of the plurality of idle antennas. The apparatus may include means for collecting touch indications, wherein each touch indication indicates whether a corresponding antenna of the plurality of antennas is in contact with a physical entity. The plurality of antennas and the plurality of transceivers may be part of a mobile device, the plurality of antennas may comprise all antennas of the mobile device, and the plurality of transceivers may comprise all transceivers of the mobile device. The means for identifying the one or more antennas likely to serve as the effective electromagnetic transducer may comprise: means for analyzing the touch indications to identify the one or more antennas that is in a least amount of contact with a physical entity. The apparatus may include means for uncoupling the first transceiver of the plurality of transceivers from all antennas of the plurality of antennas when the first transceiver is not in use. The apparatus may include means for collecting signal-to-noise measurements, wherein each signal-to-noise measurement is associated with a corresponding transceiver of the plurality of transceivers; and means for determining to modify a mapping of antennas to the first transceiver of the plurality of transceivers based at least in part on the signal-to-noise measurements.

In some embodiments, a system for mapping antennas to transceivers may be presented. The system may include a plurality of antennas, wherein each antenna of the plurality of antennas is configured to receive radio signals in accordance with a plurality of radio technologies. The system may include a plurality of transceivers, wherein at least one transceiver of the plurality of transceivers is configured to utilize a first radio technology different from a second radio technology utilized by at least one other transceiver of the plurality of transceivers. The system may include a selector circuit that is configured, based on input from a processor, to map antennas of the plurality of antennas with transceivers of the plurality of transceivers. The processor may be configured to control mapping the plurality of antennas to the plurality of transceivers. The system may include a plurality of touch sensors, wherein each touch sensor of the plurality of touch sensors indicates whether a corresponding antenna of the plurality of antennas is in contact with an external object. The system may include a plurality of signal to noise measurement collectors, wherein each signal to noise measurement collector corresponds to a transceiver of the plurality of transceivers and determines a signal to noise measurement for the corresponding transceiver. The processor may be further configured to use a signal-to-noise measurement from at least one of the plurality of signal to noise measurement collectors and an indication from at least one of the plurality of touch sensors to determine a modification to a mapping of at least one antenna of the plurality of antennas with at least one transceiver of the plurality of transceivers. In some embodiments, the selector circuit is part of the processor.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
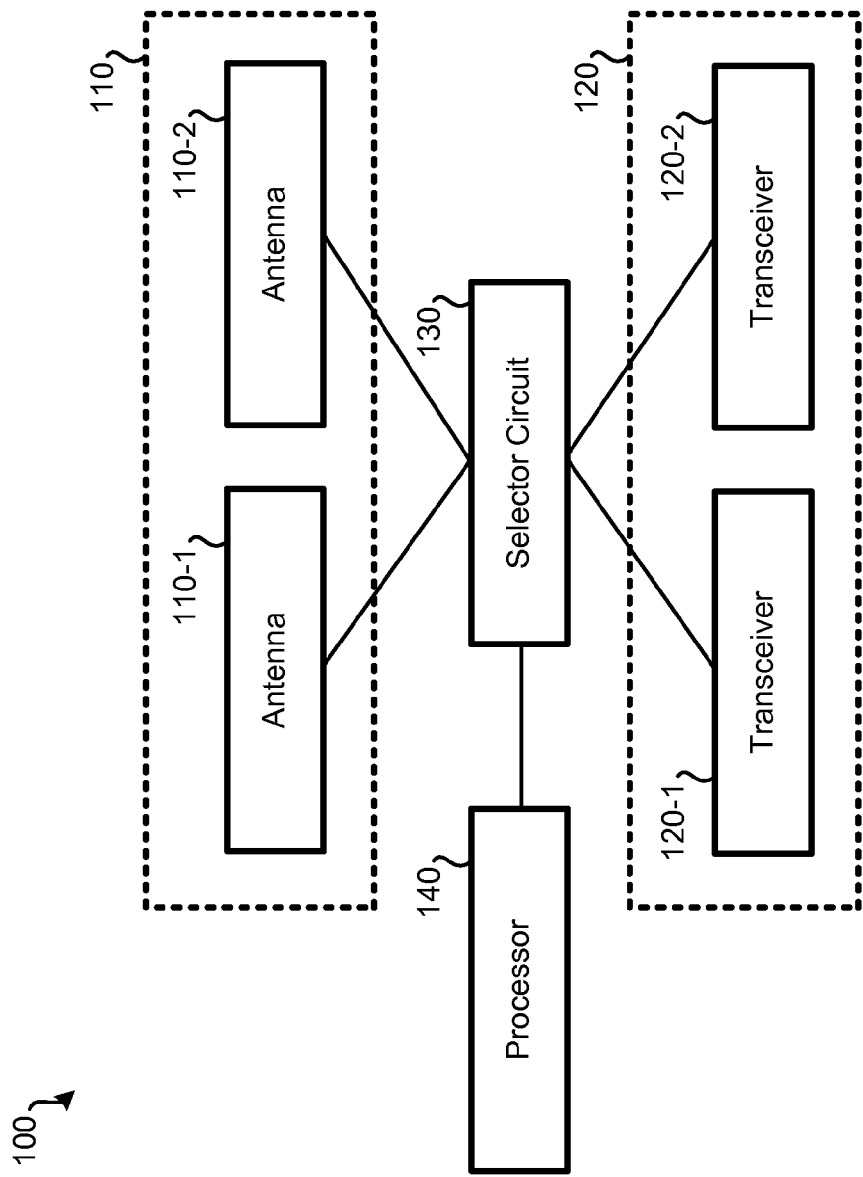
FIG. 1 illustrates an embodiment of a system having multiple antennas configured to be mapped to multiple transceivers.

Many devices, such as mobile devices, that are capable of wireless communication have multiple antennas. Such devices may have multiple transceivers, with each transceiver coupled with, typically, one or two antennas. For example, a mobile device, such as a cellular phone, may have a transceiver that communicates with a cellular network, using a cellular communication radio technology, such as CDMA. This CDMA transceiver may be coupled with two antennas to allow for diversity reception, when necessary. This same mobile device may have multiple other transceivers, such as a transceiver for Bluetooth and a transceiver for WiFi radio technologies. If each of these transceivers is connected with two dedicated antennas, the total number of antennas on the mobile device is, at a minimum, six. Other mobile devices may contain even greater numbers of transceivers and, thus, greater numbers of antennas. As the number of transceivers on a mobile device increases, the number of antennas may similarly increase if antennas are dedicated to a particular transceiver.

Rather than an antenna being coupled with only a particular transceiver, an antenna may be configured to be alternatively mapped to multiple transceivers. For example, the mapping may include selectively connecting, either physically or functionally, a transceiver of a plurality of transceivers to a given antenna. As such, if a particular antenna (or group of antennas, such as two antennas being used for diversity reception) is not functioning effectively (e.g., a weak signal is being received), the transceiver can be mapped to another antenna selected from a set (e.g., plurality) of antennas that may be used regardless of the radio technology of the transceiver. As such, the antennas may be radio technology-independent. For example, an antenna that is currently used for cellular communication may, at some other point in time, be used in conjunction with a different radio technology, such as WiFi, that relies on a different protocol and/or frequency. In some embodiments, any transceiver used for wireless communications in a device may be selectively connected to and used with a certain antenna or a certain group of antennas used in that device. In one embodiment, any transceiver used for wireless communications in a device may be selectively connected to and used with any antenna implemented in that device.

The use of a set of antennas may permit antennas that are likely to serve as an effective electromagnetic transducer to be used. For example, referring to a mobile device, a user's body, or some other form of physical entity, in contact with an antenna may degrade the antenna's ability to function as an effective electromagnetic transducer due to the user's body obstructing transmission and/or reception of signals and/or the user's body altering the electromagnetic characteristics of the antenna. As an example, if an antenna is located, at least partially, on the mobile device's external surface, while the user is holding the device, the user's hand may contact the antenna. Such contact may degrade that antenna's ability to function as an effective electromagnetic transducer. As such, receiving and/or transmitting (referred to generally as "communicating") using that antenna may result in: 1) a lower signal-to-noise ratio (SNR); 2) diversity reception being desired; and/or 3) increased power consumption (such as due to using diversity reception or having to transmit at a higher power level). As such, regardless of the radio technology being used, communication using one or more antennas not in contact (or in less contact) with a user or some other physical entity may result in improved communication with a remote wireless network.

When a device determines that an antenna is no longer serving as a sufficiently effective electromagnetic transducer, the device may determine which antenna (or antennas) to use. For example, the device may select from one or more idle antennas (e.g., that are not being used for communication by a transducer) or may reassign antennas currently in use. Since certain of the antennas that are available to use may currently be idle, it may not be possible to use SNR measurements to select which of these antennas to use because the antennas are not currently mapped to a transceiver or being used for communication. Rather than using SNR measurements to select an antenna to use, touch sense measurements, collected by one or more touch sensors, may be used to determine which antennas are likely to serve as an effective electromagnetic transducer. Each antenna may be monitored by one or more touch sensors. Each touch sensor may be able to determine whether a physical entity, such as a user or other external object, is in contact with a corresponding antenna. If a physical entity is determined to be in contact with an antenna, the corresponding touch sensor may provide an indication of how much contact is present. For example, a touch sensor may provide a score, such as on a scale of 1-10, of how much contact is present between the antenna and the physical entity. The device may give preference to antennas that have the least contact with physical entities. As such, if the device determines to map a transceiver to a different antenna, an antenna that has the least contact with a physical entity may be selected as being more likely to serve as an effective electromagnetic transducer than the antennas in contact with the physical entity.

Such mapping of antennas with transceivers of different radio technologies may result in lowered electrical current usage and, thus, lower power consumption. For example, when a transceiver is not in use (e.g., it has not transmitted or received for a certain period of time or has been deactivated by a user), the transceiver may be powered down and disconnected from all antennas. Further, rather than relying on antenna diversity (the use of multiple antennas by a transceiver), a single antenna that can serve as a more effective electromagnetic transducer may be used instead. Using a more effective antenna(s) may result in less power being used by the associated transceivers. In a mobile device, this may translate to extended battery life and/or a lower ampere-hour.

FIG. 1 illustrates an embodiment of a system 100 having multiple antennas configured to be mapped to multiple transceivers. System 100 may include: antennas 110, transceivers 120, selector circuit 130, and processor 140. System 100 may be present in a device that communicates wirelessly. System 100 may be present in a mobile device, such as a cellular phone. System 100 may also be present in other forms of mobile devices, such as: tablet computers, laptop computers, and gaming devices.

Other devices may also contain system 100.

In system 100, antennas 110 may represent all antennas present on a device, or a portion of the antennas present on the device. Antennas 110 may include two or more antennas. Antennas 110 may be coupled with selector circuit 130. Each antenna of antennas 110 may be a wideband antenna configured to communicate (e.g., transmit and/or receive radio signals) in accordance with different radio technologies. For example, each antenna of antennas 110 may be configured to serve as an effective electromagnetic transducer for radio technologies and/or multiple different frequencies. In some embodiments, antennas 110 are identical. In some embodiments, various antennas of antennas 110 may have different characteristics such that some antennas are more effective at serving as a transducer for particular frequencies or wireless protocols. For example, antenna 110-1 may be an antenna that can be effectively used as an electromagnetic transducer at a variety of frequencies but is more effective when used for a particular range of frequencies. Similarly, antenna 110-2 may be an antenna that can be effectively used as an electromagnetic transducer at a variety of frequencies but is more effective when used for a particular range of frequencies. The range of frequencies for antenna 110-2 may be different from the range of frequencies for antenna 110-1. As such, antenna 110-1 may be used as a default antenna for a first transceiver that communicates using a frequency within the range of frequencies of antenna 110-1 and antenna 110-2 may be used as a default antenna for a second transceiver that communicates using a frequency within the range of frequencies of antenna 110-2. Depending on wireless conditions, however, antenna 110-2 may be used with the first transceiver, and antenna 110-1 may be used with the second transceiver in some embodiments, even if the transceivers use different radio technologies.

Selector circuit 130 may be coupled with antennas 110 and transceivers 120. Selector circuit 130 may be configured to map any transceiver of transceivers 120 with any antenna of antennas 110. Selector circuit 130 may be a separate circuit, may be part of processor 140, or may be part of some other processor. Mapping may refer to associating a particular transceiver with a particular antenna. For example, when selector circuit 130 has "mapped" a transceiver to an antenna, radio signals received via the antenna are provided to the input of the transceiver, and the output of the transceiver is provided to the antenna. Selector circuit 130 may map transceivers 120 with antennas 110 via soft switching. For example, selector circuit 130 may route data to and from various antenna/transceiver combinations by altering the memory addresses of selector circuit 130. Information received via antenna 110-1 may be written to a memory address linked with a particular transceiver. If antenna 110-1 is mapped to a different transceiver, a different memory address may be used. Selector circuit 130 may be configured to map multiple antennas of antennas 110 to a single transceiver of transceivers 120. Such an arrangement may allow for diversity communication by allowing a single transceiver to use two (or more) antennas. Besides soft switching, in some embodiments mapping may involve selector circuit 130 physically coupling one or more transceivers to one or more antennas.

Processor 140 may determine which antenna or antennas should be mapped with which transceivers. Processor 140 may determine whether a transceiver should use a single antenna or diversity. Processor 140 may be in communication with selector circuit 130. Processor 140 may control the mapping of antennas 110 to transceivers 120 via selector circuit 130.

Transceivers 120 may include two or more transceivers. Each transceiver of transceivers 120 may communicate using a different radio technology. In some embodiments, multiple transceivers that use the same radio technology may be present. Transceivers 120 may represent all or a portion of the transceivers present on a device. Each of the transceivers 120 may implement receive functionality and/or transmit functionality. Thus, use of the term transceiver herein does not imply or require that the transceiver be able to both transmit and receive messages or communications. Each of the transceivers 120 may be used to only receive information, to only transmit information, or to both receive and transmit information. For example, embodiments described herein including transceivers may be implemented using solely receivers. Alternatively, such embodiments may be implemented using only transmitters, a combination of separate receivers and transmitters, or using elements that perform both reception and transmission.

Figure 2:
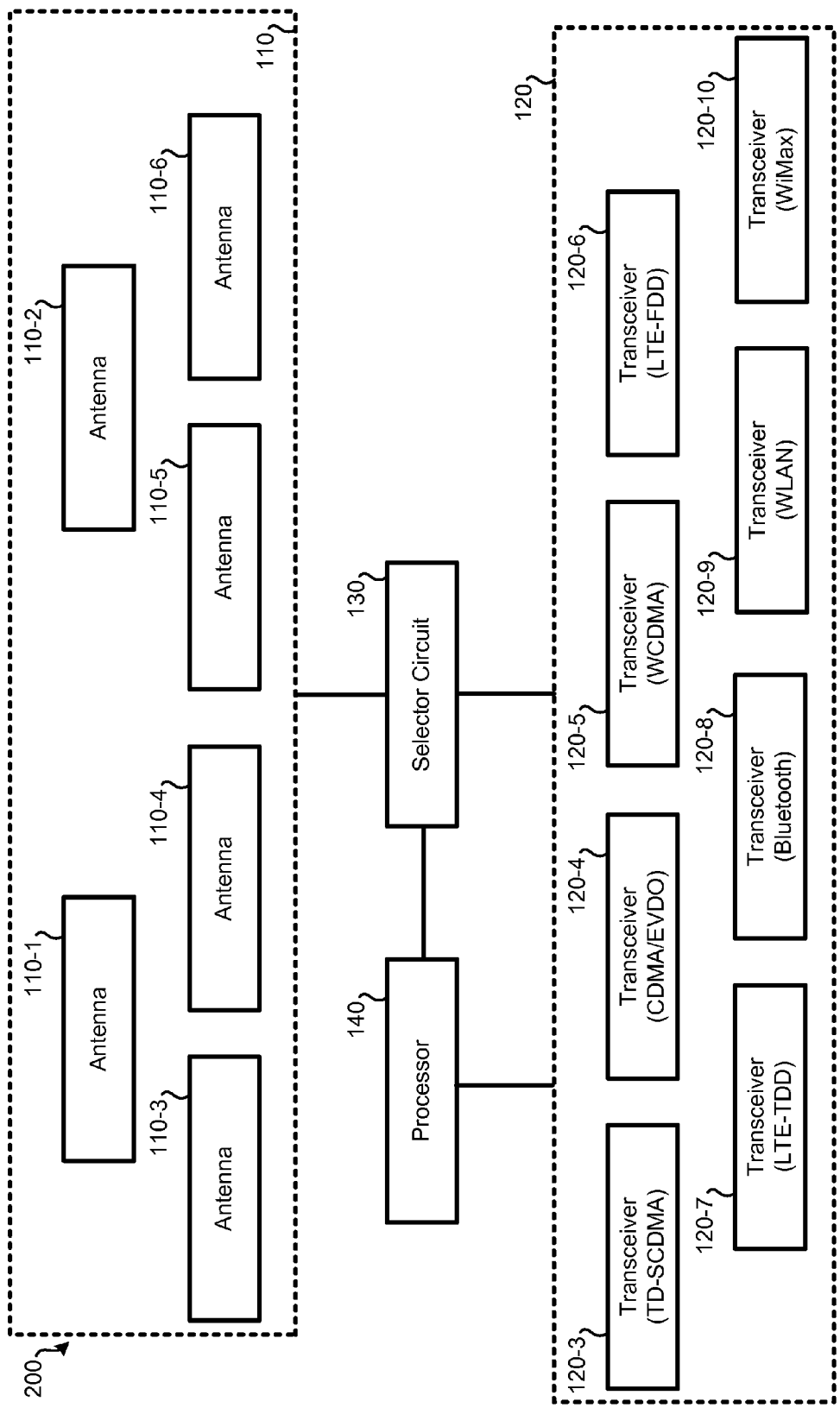
FIG. 2 illustrates an embodiment of a system for a mobile device having multiple antennas configured to be mapped to multiple transceivers.

FIG. 2 illustrates an embodiment of a system 200 for a mobile device having multiple antennas configured to be mapped to multiple transceivers. System 200 may represent some embodiments of system 100. System 200 includes: antennas 110, transceivers 120, selector circuit 130, and processor 140. System 200 may be present in a mobile device, such as a cellular phone. Such a mobile device may be capable of communication via multiple radio technologies, including: CDMA, LTE, Bluetooth, WLAN (e.g., 802.11x), and WiMax.

System 200 is illustrated as having six antennas. All antennas of the mobile device that includes system 100 may be coupled with selector circuit 130. In some embodiments, some antennas of the mobile device may not be connected with selector circuit 130. Each antenna of antennas 110 may be a wideband antenna configured to communicate using multiple radio technologies. For example, each antenna of antennas 110 may be effective at communicating using each radio technology of transceivers 120. In some embodiments, some or all of antennas 110 may be configured to be most effective for a particular radio technology and/or range of frequencies. For example, antenna 110-3 may be configured to be most effective for Bluetooth-based communication, but may also be sufficiently effective for use with other radio technologies and/or frequencies. Antenna 110-4 may be most effective for WiMax-based communication, but may also be effective for other radio technologies and/or frequencies. Each of antennas 110 may be located within, partially within, or external to the mobile device that includes system 200. For example, one or more antennas of antennas 110 may be internal to the mobile device, one or more antennas may partially extrude from the mobile device (e.g., the antenna is on one or more external surfaces of the mobile device), and one or more antennas may extrude from the mobile device (e.g., the antenna extends from the body of the mobile device).

Selector circuit 130 may be coupled with antennas 110 and transceivers 120. Selector circuit 130 may be configured to map any antenna of antennas 110 with any transceiver of transceivers 120. In some embodiments, certain antenna/transceiver mappings may be impermissible. For example, transceiver 120-3 may not be permitted to be mapped to antenna 110-6. Such a mapping may be impermissible if a particular antenna is considered ineffective for use with a particular radio technology and/or range of frequencies. Selector circuit 130 may be a separate circuit, may be part of processor 140, or may be part of some other processor. Selector circuit 130 may map transceivers 120 with antennas 110 via soft switching as detailed in relation to system 100. Selector circuit 130 of system 200 may also permit diversity communication by mapping a transceiver with two or more antennas of antennas 110.

For simplicity, the routing from each transceiver of transceivers 120 to selector circuit 130 is not illustrated. It should be understood that a connection between each transceiver of transceivers 120 and selector circuit 130 may be present. Similarly, the routing from each antenna of antennas 110 to selector circuit 130 is not illustrated. It should be understood that a connection between each antenna of antenna 110 and selector circuit 130 may be present.

Processor 140, as described in relation to system 100 of FIG. 1, may determine which antenna or antennas should be mapped to which transceivers. Processor 140 may be in communication with selector circuit 130 and each transceiver of transceivers 120. Communication with transceivers 120 may permit processor 140 to determine when diversity and/or changing the mapping of an antenna of antennas 110 to a transceiver of transceivers 120 is needed.

Transceivers 120 are illustrated as including eight transceivers. It should be understood that more or fewer transceivers may be present. Each transceiver of transceivers 120 may communicate using a different radio technology. In the illustrated embodiments of system 200, transceiver 120-3 is for TD-SCDMA (Time Division Synchronous Code Division Multiple Access), transceiver 120-4 is for CDMA/EVDO (Code Division Multiple Access/Evolution Data Optimized), transceiver 120-5 is for WCDMA (Wideband Code Division Multiple Access), transceiver 120-6 is for LTE-FDD (Long Term Evolution Frequency Division Duplex), transceiver 120-7 is for LTE-TDD (Long Term Evolution Time Division Duplex), transceiver 120-8 is for Bluetooth, transceiver 120-9 is for WLAN (Wireless Local Area Network) (e.g., an 802.11x wireless network), and transceiver 120-10 is for WiMax (Worldwide Interoperability for Microwave Access). It should be understood that these radio technologies are for example purposes only, other radio technologies may also be used.

In some embodiments, all transceivers may not be used at the same time. For example, if a mobile device is communicating using CDMA, LTE transceivers may not be active at the same time. The number of antennas present in system 200 may be reduced because antennas are shared by transceivers using different radio technologies. As illustrated in system 200 of FIG. 2, six antennas are present in antennas 110. Therefore, only six or fewer of transceivers 120 may be communicating using a dedicated antenna at a given time. Accordingly, one or more transceivers of transceivers 120 may be in a powered-down mode when not mapped to an antenna of antennas 110. A transceiver in a powered-down mode may use less current/power than when in a powered-up mode. Reducing the number of antennas present in system 200 may save space within the mobile device and/or may decrease manufacturing/material costs. If a transceiver of transceivers 120 is using diversity communication, and thus is using two or more antennas, even fewer other transceivers may be active because of the limited number of antennas 110. In some embodiments, if additional antennas are needed, a transceiver using diversity communication may be re-mapped to only one antenna to free an antenna to be mapped to another transceiver.

Figure 3:
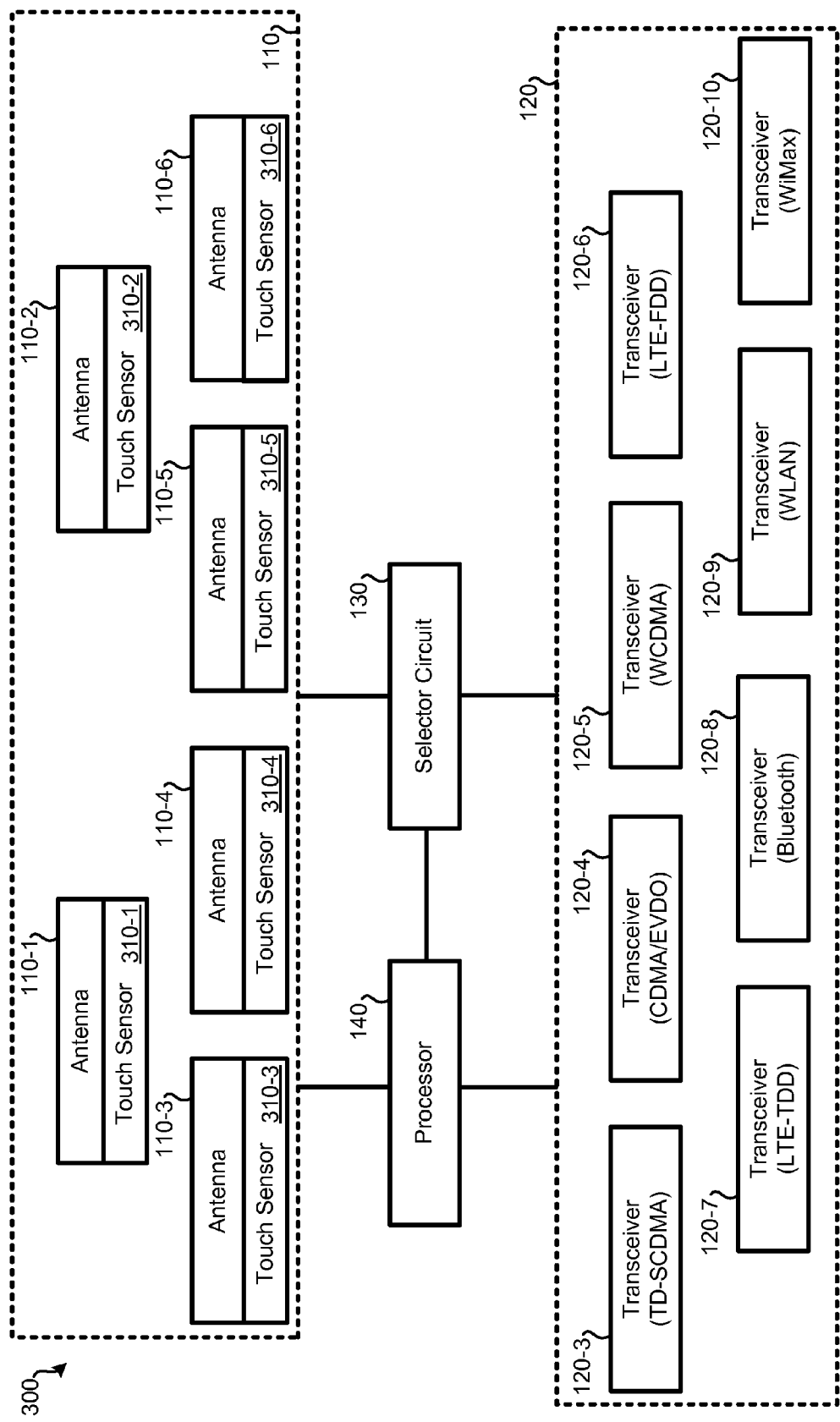
FIG. 3 illustrates an embodiment of a system for a mobile device having multiple antennas configured to be mapped to multiple transceivers at least partially based on touch data from touch sensors.

FIG. 3 illustrates an embodiment of a system for a mobile device having multiple antennas configured to be mapped to multiple transceivers at least partially based on indications from touch sensors. System 300 may represent some embodiments of system 100 and system 200 of FIGS. 1 and 2, respectively. System 300 includes: antennas 110, transceivers 120, selector circuit 130, processor 140, and touch sensors 310. System 300 may be present in a mobile device, such as a cellular phone. System 300 may also be present in other devices that communicate wirelessly.

In system 300, each of antennas 110 is associated with a corresponding touch sensor (e.g., antenna 110-1 is associated with touch sensor 310-1, etc.). A touch sensor may collect touch data that identifies: 1) whether a physical object, such as a user, is in contact with the corresponding antenna; and/or 2) how much contact between the physical object and the antenna is occurring. Touch sensors 310 may periodically transmit such touch data to processor 140. In some embodiments, touch sensors 310 may be polled by processor 140 when touch data is needed by processor 140.

Touch data from touch sensors 310 may be used by processor 140 to determine which antenna is likely to serve as an effective electromagnetic transducer, that is, an electromagnetic transducer that is likely to permit a transceiver to communicate effectively (e.g., a sufficiently low SNR and/or at a low power) with a remote wireless network. An antenna that has no contact with a physical entity (or less contact with a physical entity than another antenna) may be expected to be effective because it is less likely to be blocked and/or the electromagnetic characteristics of the antenna are not affected by the physical entity. If an antenna of antennas 110 is currently not being used, no transceiver may be mapped to the antenna by selector circuit 130. As such, no (accurate) SNR measurement may be taken for that antenna. Rather than using a SNR measurement to select an antenna, touch data from the corresponding touch sensor may be used to determine whether the antenna is likely to serve as an effective electromagnetic transducer.

The following example is provided for illustration purposes only. Consider a situation where antenna 110-3 is mapped to transceiver 120-4. Processor 140 may determine that antenna 110-3 is no longer serving as an effective electromagnetic transducer. As such, processor 140 may determine which other antenna of antennas 110 transceiver 120-4 should be mapped to. Processor 140 may only select from antennas that are currently idle, that is, antennas that are not currently being used by another transceiver to receive or transmit. For this example, only antenna 110-1 and antenna 110-2 are idle. As such, processor 140 is selecting from these two antennas.

The processor may analyze touch data received from touch sensor 310-1 (which corresponds to antenna 110-1) and touch sensor 310-2 (which corresponds to antenna 110-2). This touch data may have been previously transmitted to processor 140 or may be collected, as needed, by processor 140 via polling, for example. In such embodiments, processor 140 may transmit a message to touch sensor 310-1 and touch sensor 310-2 to trigger each touch sensor to respond with touch data. The received touch measurements may be used by the processor to determine which antenna is to be used. Continuing with the example, assume the user's hand position results in antenna 110-1 being partially covered, but antenna 110-2 is left completely uncovered. As such, the touch measurements received by processor 140 from touch sensor 310-1 may indicate approximately 50% coverage, while the touch measurements from touch sensor 310-2 may indicate no coverage. Accordingly, processor 140 may determine to map transceiver 120-4 to antenna 110-2. Processor 140 may transmit an indication of the mapping to selector circuit 130, which may implement the mapping. If selector circuit 130 is part of processor 140, such a transmission may be unnecessary as the processor 140 may itself perform the mapping, for example using soft switching as described above. Transceiver 120-4 may then communicate via antenna 110-2.

For simplicity, the routing from each transceiver of transceivers 120 to selector circuit 130 is not illustrated. Similarly, the routing from each antenna of antennas 110 to selector circuit 130 is not illustrated. Also, the routing from each touch sensor of touch sensors 310 to processor 140 and the routing from processor 140 to each transceiver of transceivers 120 is not illustrated. It should be understood that such connections may be present.

Figure 4:
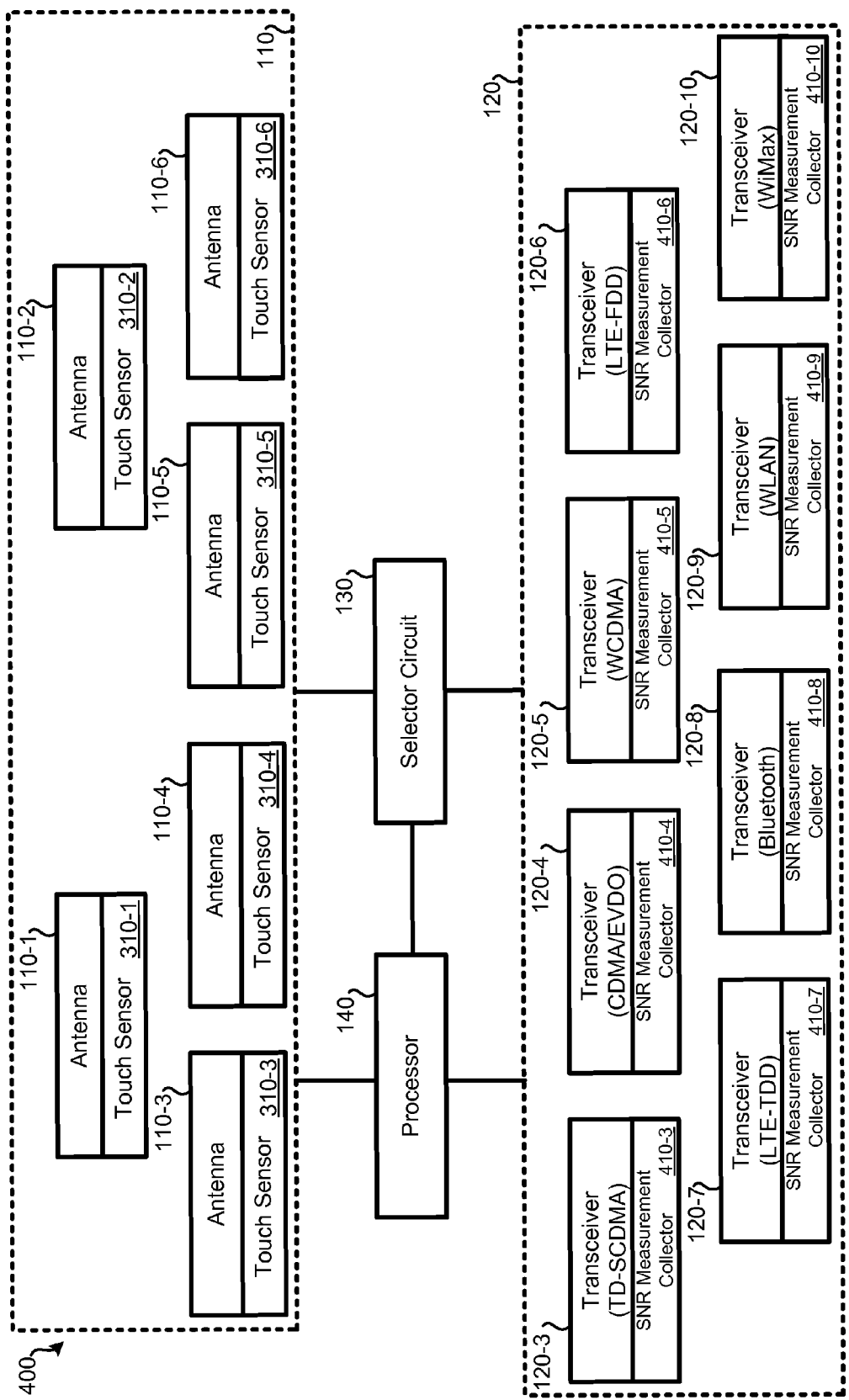
FIG. 4 illustrates an embodiment of a system for a mobile device having multiple antennas configured to be mapped to multiple transceivers, at least partially based on indications from signal to noise measurement collectors and touch sensors.

FIG. 4 illustrates an embodiment of a system 400 for a mobile device having multiple antennas configured to be mapped to multiple transceivers using SNR measurements and touch sensors. System 400 may represent some embodiments of system 100, system 200, and system 300 of FIGS. 1-3, respectively. System 400 includes: antennas 110, transceivers 120, selector circuit 130, processor 140, touch sensors 310, and SNR measurement collectors 410. System 400 may be present in a mobile device, such as a cellular phone. System 400 may also be present in other devices that communicate wirelessly.

In system 400, each transceiver may be associated with a corresponding SNR (signal-to-noise ratio) measurement collector of SNR measurement collectors 410 (e.g., SNR measurement collector 410-3 collects SNR measurements for transceiver 120-3). An SNR measurement collector of SNR measurement collectors 410 may be part of each transceiver of transceivers 120 or may be a separate component. Each SNR measurement collector of SNR measurement collectors 410 may periodically determine, collect, and/or transmit SNR measurements to processor 140. Such periodic transmission of SNR measurements may only occur when the corresponding transceiver is actively communicating. In some embodiments, SNR measurement collectors 410 each may only transmit SNR measurements to processor 140 when requested by processor 140. In some embodiments, SNR measurement collectors 410 collect SNR measurements from another location in system 400, such as at selector circuit 130 or antennas 110.

The SNR measurements received by processor 140 may be used to determine when: 1) a transceiver should be mapped to a different antenna; and/or 2) when diversity of antennas should be used for a particular transceiver. Processor 140 may rely on various thresholds to determine whether the antenna used should be switched and/or whether diversity of antennas should be used. For example, a first SNR threshold may be used to determine that an antenna should continue to be used, but a second antenna (diversity) should be used in addition. Similarly, the first SNR threshold may be used to determine which antenna of a plurality of antennas to set as the primary antenna for diversity reception and which antenna(s) to set as secondary. A second SNR threshold may be used to determine that the current antenna should stop being used and another antenna should be used instead. This SNR threshold may be associated with a higher noise level (i.e., a lower SNR ratio) than the first SNR threshold.

While SNR measurements from SNR measurement collectors 410 may be used by processor 140 to determine when 1) a transceiver should be mapped to a different antenna; and/or 2) when diversity of antennas should be used, processor 140 may rely on touch data from touch sensors 310 to determine which idle antenna should be selected when an antenna/transceiver mapping is being changed or diversity is being employed. In some embodiments, the processor 140 uses touch data for a given antenna in combination with a recent SNR measurement for that antenna to determine whether to map a transceiver to the antenna. In some embodiments, a recent SNR measurement for a first antenna may be compared to a predicted SNR for a second antenna that has been idle for a relatively longer time in order to choose between the two antennas or select the appropriate settings and transceivers for the two antennas. The SNR may be predicted based on the touch data for the second antenna.

As noted in relation to the previous figures, routing between antennas, touch sensors 310, processor 140, selector circuit 130, and transceivers 120 has been simplified. Similarly, for simplicity of FIG. 4, routing between SNR measurement collectors 410 and processor 140 has been omitted. It should be understood that routing between these components may be present.

Figure 5:
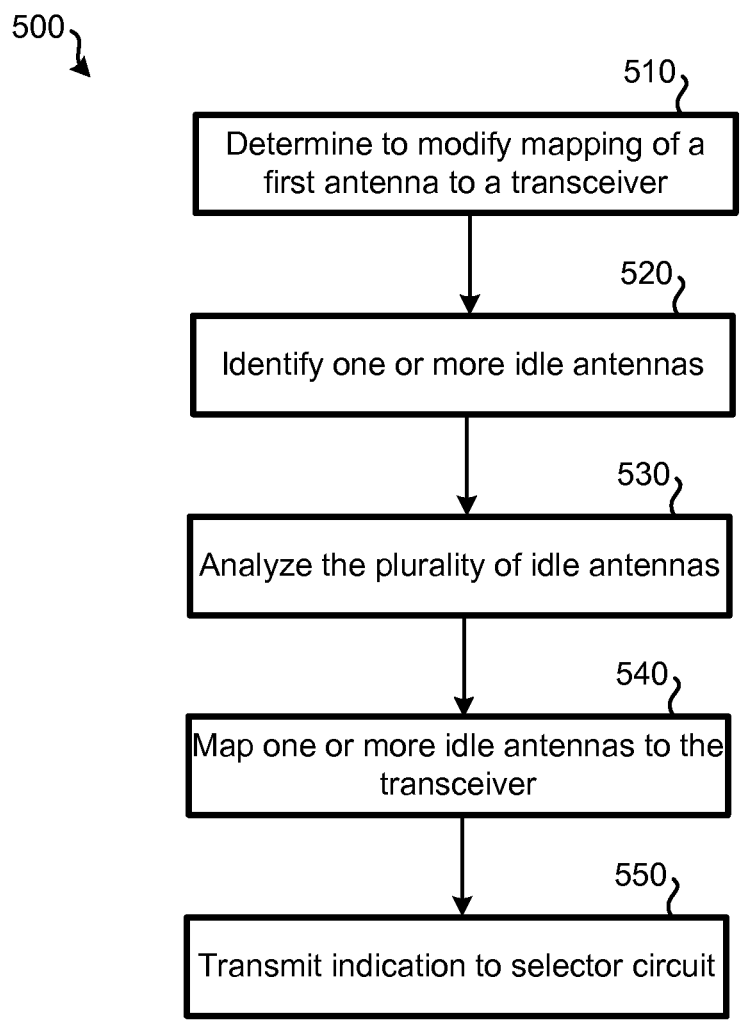
FIG. 5 illustrates an embodiment of a method for mapping an antenna to a transceiver.

The previously detailed systems may be used to perform various methods, such as the method 500. FIG. 5 illustrates an embodiment of a method 500 for mapping an antenna to a transceiver. Method 500 may be performed using system 100 of FIG. 1, system 200 of FIG. 2, system 300 of FIG. 3, system 400 of FIG. 4, or some other system for mapping an antenna to a transceiver. Each step of method 500 may be performed by one of the aforementioned systems. More specifically, each step of method 500 may be performed by a processor, such as processor 140 of FIGS. 1-4.

At step 510, it may be determined that the mapping of an antenna to a transceiver is to be modified. This may be based on the transceiver not being able to effectively communicate with a corresponding wireless network (e.g., the antenna is no longer serving as an effective electromagnetic transducer). Modifying the mapping of an antenna to a transceiver may, for example, involve: 1) switching from use of only a first antenna to diversity of antennas (while maintaining the use of the first antenna or selecting multiple different antennas); 2) switching from use of diversity of antennas to use of a single antenna (which may be one of the diversity antennas being used or a different antenna); 3) switching from use of only a first antenna to use of only a second antenna; or 4) switching from diversity of multiple antennas to diversity using some or all different antennas. Step 510 may be performed, for example, by the processor 140 or other such means for determining.

At step 520, one or more idle antennas may be identified. This may involve determining which antennas are not currently mapped to a transceiver. An idle antenna may also be an antenna that is mapped to a transceiver, but the transceiver is not communicating using the antenna. Idle antennas may have previously been mapped to one or more transceivers that use a variety of radio technologies and/or frequencies for communication. To identify the one or more idle antennas, a processor may assess a storage device, such as memory, to determine which antennas are currently mapped to a transceiver and which are not. In some embodiments, the processor may poll transceivers to determine which are actively communicating and which are idle (for example, linked with idle antennas or disconnected from all antennas). An idle transceiver may be defined as a transceiver that has not communicated for some threshold period of time, such as one second, one minute, or one hour, for example.

At step 530, the plurality of idle antennas may be analyzed. In some embodiments, this may involve accessing touch data that identifies how much an idle antenna is contacting a physical entity, such as a user's hand. Analyzing the plurality of idle antennas may involve analyzing a listing (or other data storage structure) that provides priority or default mapping information for transceivers and/or antennas. For example, as previously detailed, while each antenna may be a wideband antenna that is capable of serving as an effective electromagnetic transducer for multiple radio technologies and/or frequencies, some antennas may be more effective at communicating using certain radio technologies and/or frequencies. As such, analyzing the plurality of idle antennas may involve comparing which antennas are idle against a list of preferred antennas for particular radio technologies. An example of such list is provided in table 1.

TABLE 1

|  | CDMA Transceiver | Bluetooth Transceiver | LTE Transceiver | WLAN Transceiver |
| --- | --- | --- | --- | --- |
| Antenna 1 | 3 | 4 | 1 | 4 |
| Antenna 2 | 1 | 3 | 4 | 2 |
| Antenna 3 | 2 | 1 | 3 | 1 |
| Antenna 4 | 4 | 2 | 2 | 3 |

Table 1 provides an example listing of the prioritization of antennas by radio technology. In the embodiment of table 1, the device has four antennas and four transceivers that each use a different radio technology. As an example, for the CDMA transceiver, the highest prioritized antenna is antenna 2. Therefore, if antenna 2 is idle, antenna 2 may be used for CDMA communication. If antenna 2 is not available (e.g., it is in contact with a physical entity and/or it is in use by another transceiver), antenna 3, the next antenna listed for priority for the CDMA transceiver, may be used. The prioritization of other transceivers may be the same or different from the CDMA transceiver. For instance, in some embodiments, each transceiver may have a different highest priority (default) antenna. Step 530 may be performed, for example, by the processor 140 or other such means for analyzing.

At step 540, one or more idle antennas may be mapped to the transceiver determined at step 510. These idle antennas may have previously been used for communication with transceivers of other radio technologies and/or frequencies. The first antenna may be unmapped from the transceiver. If diversity is being used, the first antenna may remain mapped to the transceiver. At step 550, an indication may be transmitted to a selector circuit to implement the mapping assigned at step 540. As previously detailed, if soft switching is being used, the mapping change may result in changes to only the memory addresses of the processor or selector circuit where information of the transceiver and/or the antennas is written and/or read. Step 540 may be performed, for example, by the processor 140, a separate selector circuit (e.g. the selector circuit 130 when implemented separate from the processor 140), or other such means for mapping.

Figure 6:
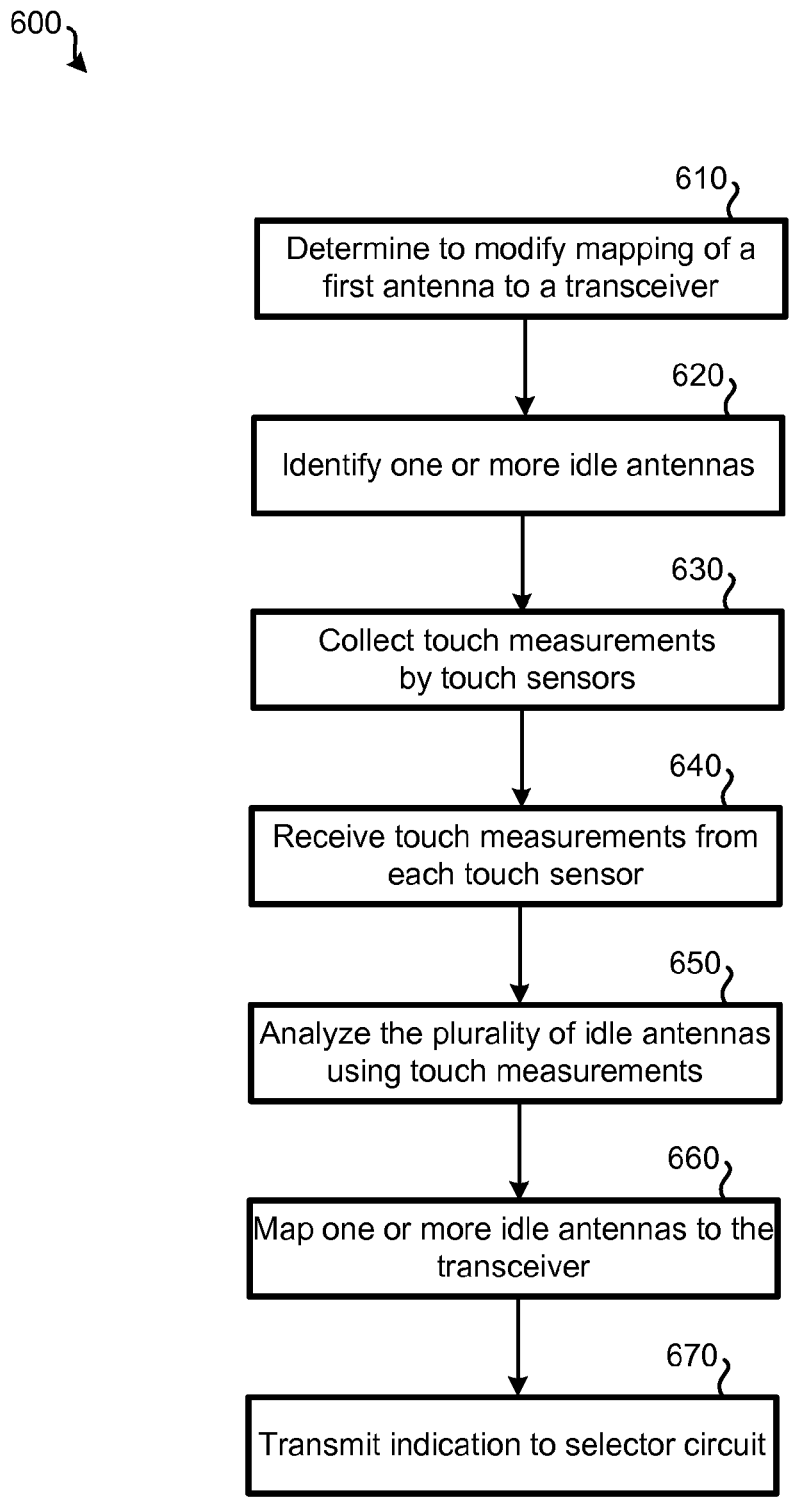
FIG. 6 illustrates an embodiment of a method for mapping an antenna to a transceiver based on touch data from touch sensors.

FIG. 6 illustrates an embodiment of a method for mapping an antenna to a transceiver based on touch data from touch sensors. Method 600 may be performed using system 100 of FIG. 1, system 200 of FIG. 2, system 300 of FIG. 3, system 400 of FIG. 4, or some other system for mapping an antenna to a transceiver. Each step of method 600 may be performed by one of the aforementioned systems. More specifically, steps of method 600 may be performed by a processor, such as processor 140 of FIGS. 1-4. Method 600 may represent a more detailed embodiment of method 500.

At step 610, it may be determined that the mapping of an antenna to a transceiver is to be modified. The determination to change the mapping of an antenna to a transceiver may be based on SNR measurements and/or touch data. Due to poor signal quality, SNR measurements may reflect a high level of noise, thus resulting in the transceiver not being able to effectively communicate with a corresponding wireless network. Modifying the mapping of an antenna to a transceiver may involve, for example: 1) switching from use of only a first antenna to diversity of antennas (while maintaining the use of the first antenna or selecting multiple different antennas); 2) switching from use of diversity of antennas to use of a single antenna (which may be one of the diversity antennas being used or a different antenna); 3) switching from use of only a first antenna to use of only a second antenna; or 4) switching from diversity of multiple antennas to diversity using some or all different antennas. Step 610 may be performed, for example, by the processor 140 or other such means for determining.

At step 620, one or more idle antennas may be identified. This may involve determining which antennas are not currently mapped to a transceiver. An idle antenna may also be an antenna that is mapped to a transceiver, but the transceiver is not communicating using the antenna. Idle antennas may have previously been mapped to one or more transceivers that use a variety of radio technologies and/or frequencies for communication. To identify the one or more idle antennas, a processor may assess a storage device, such as memory, to determine which antennas are currently assigned to a transceiver and which are not. In some embodiments, the processor may poll transceivers to determine which are actively communicating and which are idle (for example, linked with idle antennas or disconnected from all antennas). An idle transceiver may be defined as a transceiver that has not communicated for some threshold period of time, such as one second, one minute, or one hour. Step 620 may be performed, for example, by the processor 140 or other such means for identifying.

At step 630, one or more touch sensors may collect touch data. This may involve each touch sensor detecting 1) whether a physical entity, such as a hand, is in contact with its corresponding antenna; and 2) if a physical entity is in contact with the corresponding antenna, what degree of contact is present. The touch data collected by each touch sensor may be represented as a number, such as from 0-10, wherein 0 indicates no contact and 10 indicates 100% contact between the antenna and the physical entity. Such a measurement scale is for example purposes only: other scales or forms for measuring contact between an antenna and a physical entity may be possible.

Step 630 may be performed, for example, by the touch sensors 310 or other such means for collecting touch data.

At step 640, touch data may be received by the processor from one or more touch sensors. This may involve transmitting, by the processor, a message to one or more touch sensors to request that touch data be transmitted to the processor. In some embodiments, touch data may automatically be transmitted by touch sensors to the processor periodically. For instance, touch sensors may transmit touch data to the processor once per second. The touch data received by the processor may be stored and linked with a corresponding antenna. Step 640 may be performed, for example, by the processor 140 or other such means for receiving.

At step 650, the plurality of idle antennas may be analyzed. This analysis may involve using the touch data received at step 640 that identifies how much an idle antenna is contacting a physical entity. The idle antennas may be ranked according to an amount of contact with the physical entity. For example, an idle antenna that has no contact with a physical entity may be more likely to serve as an effective electromagnetic transducer than an idle antenna that has 50% contact with a physical entity because the communication path is less likely to be obstructed and/or the electromagnetic characteristics of the antenna for transmission and/or reception of data is less affected. Step 650 may be performed, for example, by the processor 140 or other such means for analyzing.

In addition to the use of the touch measurements, a list of preferred antennas for particular radio technologies may be used. In order to use such a listing, such as that described in, and in relation to, table 1, weighting between touch data and the listing may be used. For example, if any contact is detected with an idle antenna, that antenna may be ignored in favor of another antenna with no contact with a physical entity but a lower priority. In some embodiments, a priority listing may only be used when multiple idle antennas have the same or no contact with a physical entity as indicated by touch data. In some embodiments, a weighted percentage may be attributed to the touch measurements and the priority table.

$$\text{Score}_A = (w)(P_{AT}) + (1-w)(T_A) \qquad \text{Eq. 1}$$

For example, equation 1 provides an example of how touch data related to antennas and corresponding priority information may be used to select an antenna. In equation 1, a score is determined based on a weighting factor w (between zero and one), a priority P of an antenna for a transceiver associated with a particular radio technology, and a touch measurement T for the antenna. The weighting factor may be selected based on whether more weight is to be given to the priority listing or the touch data.

For T, the greater the touch measurement, the more contact between the antenna and a physical entity. For P, a numerical score may be provided, such as in table 1, for each antenna for a particular technology. The antenna that evaluates to the lowest score may be the antenna selected to be mapped to the transceiver. As should be understood, equation 1 is for exemplary purposes only: other forms of equations to evaluate which antenna to select may be used. In some embodiments, only touch sense measurements may be used to determine which antenna to select.

At step 660, one or more idle antennas may be mapped to the transceiver determined at step 610. This may involve unmapping the first antenna from the transceiver. If diversity is being used, the first antenna may remain mapped to the transceiver. At step 670, an indication may be transmitted to a selector circuit to implement the mapping assigned at step 660. As previously detailed, if soft switching is being used, the mapping change may result in changes to only the memory addresses of the processor or selector circuit where information of the transceiver and/or the antennas is written and/or read. Step 660 may be performed, for example, by the processor 140, a separate selector circuit (e.g. the selector circuit 130 when implemented separate from the processor 140), or other such means for mapping.

Figure 7:
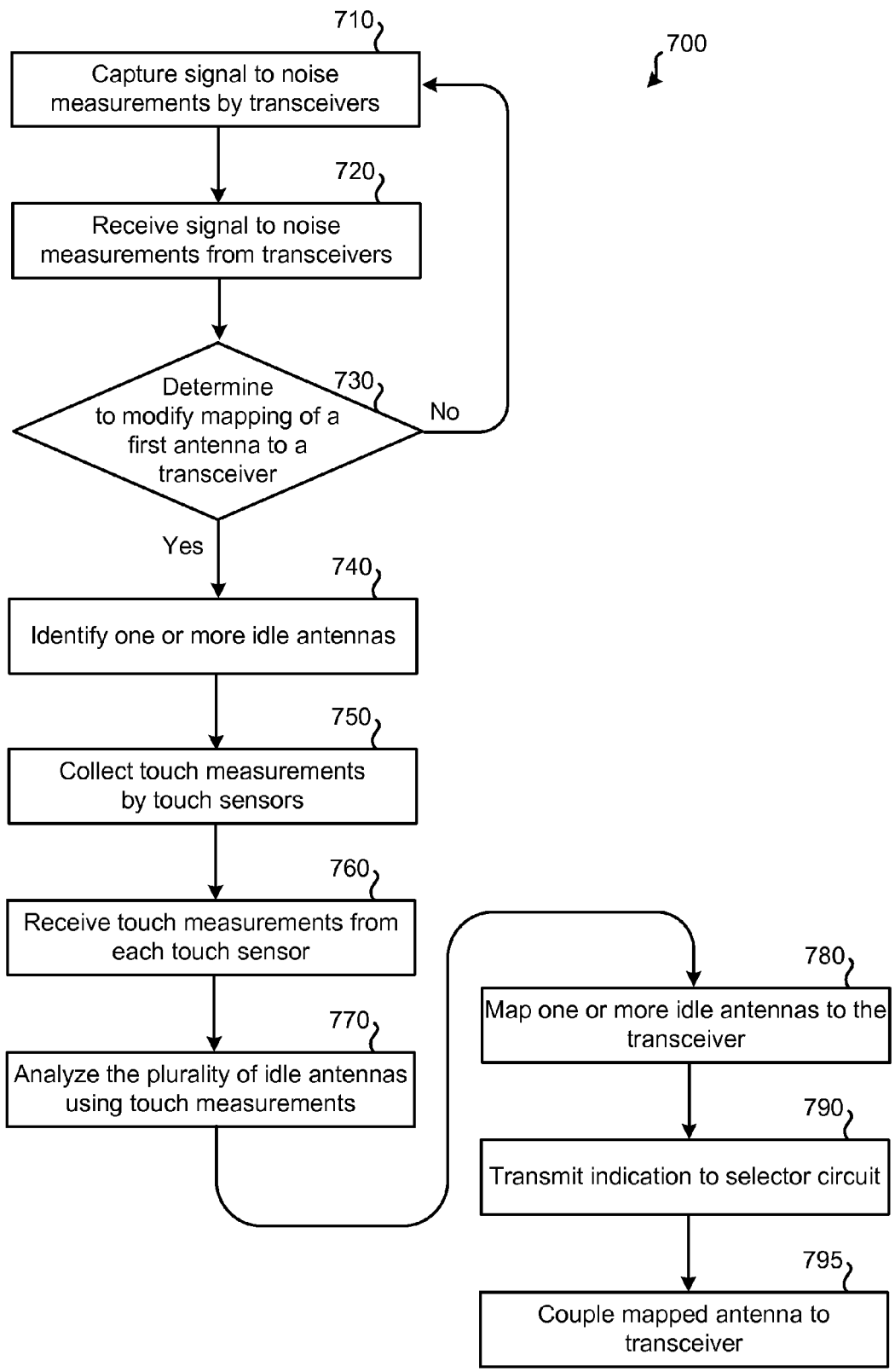
FIG. 7 illustrates an embodiment of a method for mapping an antenna to a transceiver based on signal-to-noise measurements and touch data from touch sensors.

FIG. 7 illustrates an embodiment of a method 700 for mapping an antenna to a transceiver based on indications from signal-to-noise measurements and touch data from touch sensors. Method 700 may be performed using system 100 of FIG. 1, system 200 of FIG. 2, system 300 of FIG. 3, system 400 of FIG. 4, or some other system for mapping an antenna to a transceiver. Each step of method 700 may be performed by one of the aforementioned systems. More specifically, steps of method 700 may be performed by a processor, such as processor 140 of FIGS. 1-3. Method 700 may represent a more detailed embodiment of method 500 of FIG. 5 and/or method 600 of FIG. 6.

At step 710, SNR measurements may be captured by each transceiver that is actively communicating via an antenna. In some embodiments, the SNR measurements are determined or collected by components such as SNR measurement collectors, which may be integral with or separate from the transceivers. Such SNR measurement collectors may measure the SNR at the transceivers or at some other location, such as the input from each antenna or the input or output from a selector circuit. The SNR measurements may be captured periodically, such as once every 100 ms, or in response to a request from the processor, a transceiver may transmit an SNR measurement to the processor. At step 720, the SNR measurements from one or more transceivers or SNR measurement collectors may be received by the processor.

At step 730, it may be determined whether the mapping of an antenna to a transceiver is to be modified. The determination to change the mapping of an antenna to a transceiver may be based on SNR measurements. Various predefined SNR measurement thresholds may be used to determine whether the antenna should be switched and/or whether diversity of antennas should be used. For example, a first SNR measurement threshold may be used to determine that an antenna should continue to be used but a second antenna (diversity) should be used to achieve a sufficient communication path. A second SNR measurement threshold may be used to determine that the current antenna should stop being used and another antenna should be used instead. This second SNR measurement threshold may be associated with a higher noise level than the first SNR threshold. If the SNR measurements do not exceed either threshold, method 700 may return to step 710. This loop of steps may repeat. If an SNR measurement exceeds one of the thresholds, the mapping of one or more antennas to the transceiver having the SNR measurements exceeding one of the thresholds may be modified.

As discussed in relation to method 500 and method 600, modifying the mapping of an antenna to a transceiver of step 730 may involve, for example: 1) switching from use of only a first antenna to diversity of antennas (while maintaining the use of the first antenna or selecting multiple different antennas); 2) switching from use of diversity of antennas to use of a single antenna (which may be one of the diversity antennas being used or a different antenna); 3) switching from use of only a first antenna to use of only a second antenna; or 4) switching from diversity of multiple antennas to diversity using some or all different antennas.

At step 740, one or more idle antennas may be identified. This may involve determining which antennas are not currently mapped to a transceiver. An idle antenna may also be an antenna that is mapped to a transceiver, but the transceiver is not communicating using the antenna. Idle antennas may have previously been mapped to one or more transceivers that use a variety of radio technologies and/or frequencies for communication. To identify the one or more idle antennas, a processor may assess a storage device, such as memory, to determine which antennas are currently assigned to a transceiver and which are not. In some embodiments, the processor may poll transceivers to determine which are actively communicating and which are idle (and are, therefore, linked with idle antennas). An idle transceiver may be defined as a transceiver that has not communicated for some threshold period of time, such as one second, one minute, or one hour.

At step 750, one or more touch sensors may collect touch data associated with corresponding antennas. This may involve each touch sensor detecting 1) whether a physical entity, such as a hand, is in contact with its corresponding antenna; and 2) if a physical entity is in contact with the corresponding antenna, what degree of contact is present.

At step 760, touch data may be received by the processor from one or more touch sensors. This may involve transmitting, by the processor, a message to one or more touch sensors to request that touch data be transmitted to the processor. In some embodiments, touch data may automatically be transmitted by touch sensors to the processor periodically. For instance, touch sensors may transmit data to the processor once per second. The touch data received by the processor may be, at least temporarily, stored and linked with a corresponding antenna.

At step 770, the plurality of idle antennas may be analyzed. This analysis may involve using the touch data received at step 760 that identifies how much an idle antenna is contacting a physical entity. The idle antennas may be ranked according to an amount of contact with the physical entity. For example, an idle antenna that has no contact with a physical entity may be more likely to serve as an effective electromagnetic transducer than an idle antenna that has 50% contact with a physical entity because the communication path is likely less obstructed and/or the electromagnetic characteristics of the antenna for transmission and/or reception of data is less affected. In addition to touch data, a listing of preferred antennas for particular transceivers may be used, such as detailed in relation to step 650 of method 600 of FIG. 6.

At step 780, one or more idle antennas may be mapped to the transceiver determined at step 730. This may involve unmapping the first antenna from the transceiver. If diversity is being used, the first antenna may remain mapped to the transceiver. At step 790, an indication may be transmitted to a selector circuit to implement the mapping assigned at step 780. As previously detailed, if soft switching is being used, the mapping change may result in changes to only the memory addresses of the processor or selector circuit where information of the transceiver and/or the antennas is written and/or read. At step 795, the selector circuit may map the antenna to the transceiver. Step 780 may be performed, for example, by a processor (e.g. the processor 140), a separate selector circuit (e.g. the selector circuit 130 when implemented separate from the processor 140), or by some other means for mapping.

Figure 8:
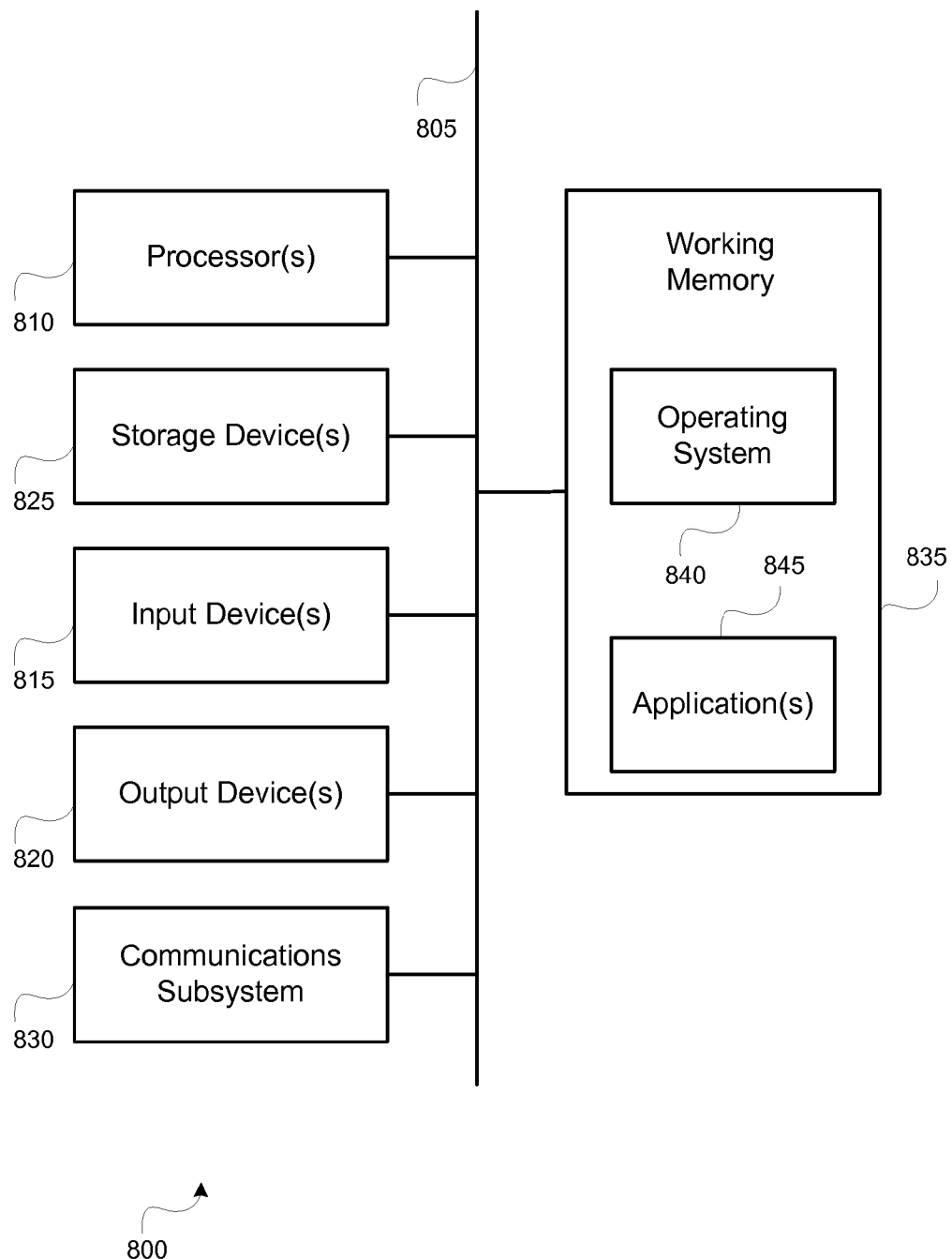
FIG. 8 illustrates an embodiment of a computer system.

The various systems described detail a processor. The processor may represent a processing device or a computer system. FIG. 8 illustrates an embodiment of such a computer system. A computer system as illustrated in FIG. 8 may function as the previously mentioned computer system. For example, computer system 800 can execute software components and/or a task generator. FIG. 8 provides a schematic illustration of one embodiment of a computer system 800 that can perform the methods provided by various other embodiments, as described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). In some aspects, the bus 805 or a component or device associated with the bus 805 is used to implement the selector circuit 130. The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like. The processor 810 may be used to implement or may be implemented in the processor 140. In some aspects the selector circuit 130 is implemented by the processor 810. One or more of the touch sensors 310 may be implemented by the input device 815.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In some embodiments, one or more of the transceivers 120 are implemented by the communications subsystem 830. In some embodiments, one or more of the SNR measurement collectors 410 are implemented by the communications subsystem 830. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as the computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc., carried by the signals) to the working memory 835, from which the processor(s) 810 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. The elements are examples and do not limit the scope of the disclosure or claims.

Specific details are given in the description to provide a thorough understanding of example configurations (including implementations). However, configurations may be practiced without these specific details. For example, certain circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure or may omit one or more illustrated steps. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A device capable of mapping antennas to transceivers, the device comprising:
   a plurality of antennas, wherein each antenna of the plurality of antennas is configured to receive radio signals in accordance with a plurality of radio technologies;
   a plurality of transceivers, wherein:
      a first transceiver of the plurality of transceivers is configured to utilize a first radio technology of the plurality of radio technologies; and
      a second transceiver of the plurality of transceivers is configured to utilize a second radio technology of the plurality of radio technologies;
   a plurality of signal to noise (SNR) measurement collectors, wherein:

each SNR measurement collector corresponds to a transceiver of the plurality of transceivers, and each SNR measurement collector of the plurality of SNR measurement collectors is configured to transmit SNR measurements associated with the corresponding transceiver to a processor; and the processor configured to:

determine a mapping between at least a subset of antennas of the plurality of antennas, the first transceiver, and the second transceiver, comprising:

mapping, based on an SNR measurement, the first transceiver to at least two antennas of the plurality of antennas.

2. The device capable of mapping antennas to transceivers of claim 1, further comprising a selector circuit that is configured, based on input from the processor, to map the one or more antennas of the plurality of antennas with one or more transceivers of the plurality of transceivers.

3. The device capable of mapping antennas to transceivers of claim 1, wherein the processor is further configured to map the one or more antennas with one or more transceivers of the plurality of transceivers using soft switching, wherein the soft switching comprises:

writing information received from an antenna of the plurality of antennas to a memory address associated with the first transceiver, wherein the memory address is selected based on the mapping.

4. The device capable of mapping antennas to transceivers of claim 1, wherein the processor is further configured to determine to unmap the first transceiver of the plurality of transceivers from all antennas of the plurality of antennas when the first transceiver is not in use.

5. The device capable of mapping antennas to transceivers of claim 1, wherein the processor is further configured to determine to map two antennas of the plurality of antennas with the second transceiver of the plurality of transceivers.

6. The device capable of mapping antennas to transceivers of claim 1, further comprising:

a plurality of touch sensors wherein each touch sensor of the plurality of touch sensors indicates contact for a corresponding antenna of the plurality of antennas.

7. The device capable of mapping antennas to transceivers of claim 6, wherein the processor is further configured to receive touch indications from each touch sensor of the plurality of touch sensors, and each touch indication indicates whether the corresponding antenna of the plurality of antennas is in contact with a physical entity.

8. The device capable of mapping antennas to transceivers of claim 7, wherein the processor is further configured to:

analyze the touch indications received from the plurality of touch sensors to identify the one or more antennas of the plurality of antennas that is in a least amount of contact with a physical entity.

9. The device capable of mapping antennas to transceivers of claim 8, wherein the processor is further configured to:

assign an antenna of the plurality of antennas to the second transceiver of the plurality of transceivers at least partially based on analyzing the touch indications from the plurality of touch sensors.

10. The device capable of mapping antennas to transceivers of claim 1, wherein each of the first transceiver and the second transceiver implement only one of a receive function and a transmit function.

11. The device capable of mapping antennas to transceivers of claim 1, wherein the processor is further configured to:

receive the signal-to-noise measurements from each signal to noise measurement collector of the plurality of signal to noise measurement collectors; and use at least one of the received signal-to-noise measurements to determine when an antenna mapping is to be modified.

12. The device capable of mapping antennas to transceivers of claim 11, further comprising:

a plurality of touch sensors wherein each touch sensor of the plurality of touch sensors indicates contact for a corresponding antenna of the plurality of antennas, wherein:

the processor is further configured to:

receive touch indications from each touch sensor of the plurality of touch sensors, wherein each touch indication indicates whether the corresponding antenna of the plurality of antennas is in contact with a physical entity; and determine a modification to the antenna mapping, based at least in part on the received touch indications, when it is determined that the antenna mapping is to be modified.

13. A method for mapping antennas to transceivers, the method comprising:

receiving a signal to noise (SNR) measurement associated with a first transceiver of a plurality of transceivers;

determining to modify a mapping of antennas to the first transceiver of the plurality of transceivers based at least in part on the first SNR measurement;

identifying two or more antennas of a plurality of antennas likely to serve as an effective electromagnetic transducer for a first radio technology of a plurality of radio technologies, wherein each antenna of the plurality of antennas is configured to receive radio signals in accordance with the plurality of radio technologies; and mapping the two or more antennas to the first transceiver of the plurality of transceivers, wherein:

the first transceiver of the plurality of transceivers is configured to utilize the first radio technology of the plurality of radio technologies.

14. The method for mapping antennas to transceivers of claim 13, further comprising:

identifying a plurality of idle antennas of the plurality of antennas, wherein each idle antenna is currently not being used for communication and the one or more antennas are part of the plurality of idle antennas.

15. The method for mapping antennas to transceivers of claim 13, wherein the plurality of antennas and the plurality of transceivers are part of a mobile device, the plurality of antennas comprises all antennas of the mobile device, and the plurality of transceivers comprises all transceivers of the mobile device.

16. The method for mapping antennas to transceivers of claim 13, wherein identifying the one or more antennas of the plurality of antennas likely to serve as the effective electromagnetic transducer comprises identifying two antennas of the plurality of antennas, and wherein the mapping comprises mapping the two antennas to the first transceiver.

17. The method for mapping antennas to transceivers of claim 13, the method further comprising:

receiving touch indications from a plurality of touch sensors, wherein
    each touch indication indicates whether a corresponding antenna of the plurality of antennas is in contact with a physical entity, and wherein the identifying is based at least in part on the received touch indications.

18. The method for mapping antennas to transceivers of claim 17, wherein identifying the one or more antennas likely to serve as the effective electromagnetic transducer comprises:
    analyzing touch indications received from the plurality of touch sensors to identify the one or more antennas that is in a least amount of contact with a physical entity.

19. The method for mapping antennas to transceivers of claim 18, further comprising:
    receiving signal-to-noise measurements from each signal to noise measurement collector of a plurality of signal to noise measurement collectors; and
    prior to analyzing the touch indications, using at least one signal-to-noise measurement to determine that an antenna mapping is to be modified.

20. A non-transitory computer readable medium comprising instructions configured to cause a computer to:
    receive signal-to-noise measurements, wherein each signal-to-noise measurement is associated with a corresponding transceiver of a plurality of transceivers; and
    determine to modify a mapping of antennas to a first transceiver of a plurality of tranceivers based at least in part on a first SNR measurement;
    identify two or more antennas of a plurality of antennas likely to serve as an effective electromagnetic transducer for a first radio technology of a plurality of radio technologies, wherein
        each antenna of the plurality of antennas is configured to receive radio signals in accordance with the plurality of radio technologies;
    map the two or more antennas to the first transceiver of the plurality of transceivers, wherein:
        the first transceiver of the plurality of transceivers is configured to utilize the first radio technology of the plurality of radio technologies.

21. The non-transitory computer readable medium of claim 20, wherein the instructions are further configured to cause the computer to:
    transmit an indication to a selector circuit that indicates to map the one or more antennas with the first transceiver of the plurality of transceivers.

22. The non-transitory computer readable medium of claim 20, wherein the instructions configured to cause the computer to identify the one or more antennas comprises instructions to cause the computer to:
    identify two antennas of the plurality of antennas, and wherein the mapping comprises mapping the two antennas to the first transceiver.

23. The non-transitory computer readable medium of claim 20, wherein the instructions are further configured to cause the computer to:
    receive touch indications from a plurality of touch sensors, wherein
        each touch indication indicates whether a corresponding antenna of the plurality of antennas is in contact with a physical entity.

24. The non-transitory computer readable medium of claim 23, wherein the instructions configured to cause the computer to identify the one or more antennas likely to serve as the effective electromagnetic transducer further comprise instructions configured to cause the computer to:
    analyze the touch indications received from the plurality of touch sensors to identify the one or more antennas that is in a least amount of contact with a physical entity.

25. The non-transitory computer readable medium of claim 20, wherein the instructions are configured to cause the computer to:
    cause the first transceiver of the plurality of transceivers to be unmapped from all antennas of the plurality of antennas when the first transceiver is not in use.

26. An apparatus for mapping antennas to transceivers, the apparatus comprising:
    means for collecting a signal-to-noise (SNR) measurement associated with a first transceiver of a plurality of transceivers; and
    means for determining to modify a mapping of antennas to the first transceiver of the plurality of transceivers based at least in part on the SNR measurement;
    means for identifying two or more antennas of a plurality of antennas likely to serve as an effective electromagnetic transducer for a first radio technology of a plurality of radio technologies, wherein
        each antenna of the plurality of antennas is configured to receive radio signals in accordance with the plurality of radio technologies; and
    means for mapping the two or more antennas to the first transceiver of the plurality of transceivers, wherein the first transceiver of the plurality of transceivers is configured to utilize the first radio technology of the plurality of radio technologies.

27. The apparatus for mapping antennas to transceivers of claim 26, the apparatus further comprising:
    means for identifying a plurality of idle antennas of the plurality of antennas, wherein each idle antenna is currently not being used for communication and the one or more identified antennas are part of the plurality of idle antennas.

28. The apparatus for mapping antennas to transceivers of claim 26, the apparatus further comprising:
    means for collecting touch indications, wherein
        each touch indication indicates whether a corresponding antenna of the plurality of antennas is in contact with a physical entity.

29. The apparatus for mapping antennas to transceivers of claim 28, wherein the means for identifying the one or more antennas likely to serve as the effective electromagnetic transducer comprises:
    means for analyzing the touch indications to identify the one or more antennas that is in a least amount of contact with a physical entity.

30. The apparatus for mapping antennas to transceivers of claim 26, wherein
    the plurality of antennas and the plurality of transceivers are part of a mobile device,
    the plurality of antennas comprises all antennas of the mobile device, and
    the plurality of transceivers comprises all transceivers of the mobile device.

31. The apparatus for mapping antennas to transceivers of claim 26, the apparatus further comprising:
    means for uncoupling the first transceiver of the plurality of transceivers from all antennas of the plurality of antennas when the first transceiver is not in use.

32. A system for mapping antennas to transceivers, the system comprising:
    a plurality of antennas, wherein each antenna of the plurality of antennas is configured to receive radio signals in accordance with a plurality of radio technologies;

a plurality of transceivers, wherein at least one transceiver of the plurality of transceivers is configured to utilize a first radio technology different from a second radio technology utilized by at least one other transceiver of the plurality of transceivers;

a selector circuit that is configured, based on input from a processor, to map antennas of the plurality of antennas with transceivers of the plurality of transceivers;

the processor that is configured to control mapping the plurality of antennas to the plurality of transceivers;

a plurality of touch sensors, wherein each touch sensor of the plurality of touch sensors indicates whether a corresponding antenna of the plurality of antennas is in contact with an external object; and a plurality of signal to noise measurement collectors, wherein each signal to noise measurement collector corresponds to a transceiver of the plurality of transceivers and determines a signal to noise measurement for the corresponding transceiver, wherein the processor is further configured to use a signal-to-noise measurement from at least one of the plurality of signal to noise measurement collectors and an indication from at least one of the plurality of touch sensors to determine a modification to a mapping of at least one antenna of the plurality of antennas with at least one transceiver of the plurality of transceivers, wherein the modification to the mapping comprises mapping multiple antennas to a first transceiver of the plurality of transceivers, at least one of the multiple antennas being determined to not be in contact with the external object.

33. The system for mapping antennas to transceivers of claim 32, wherein the selector circuit is part of the processor.

* * * * *